Feb. 25, 1964  I. L. SHECHMEISTER ETAL  3,122,127
ANIMAL HOUSING
Filed Aug. 18, 1960   5 Sheets-Sheet 1
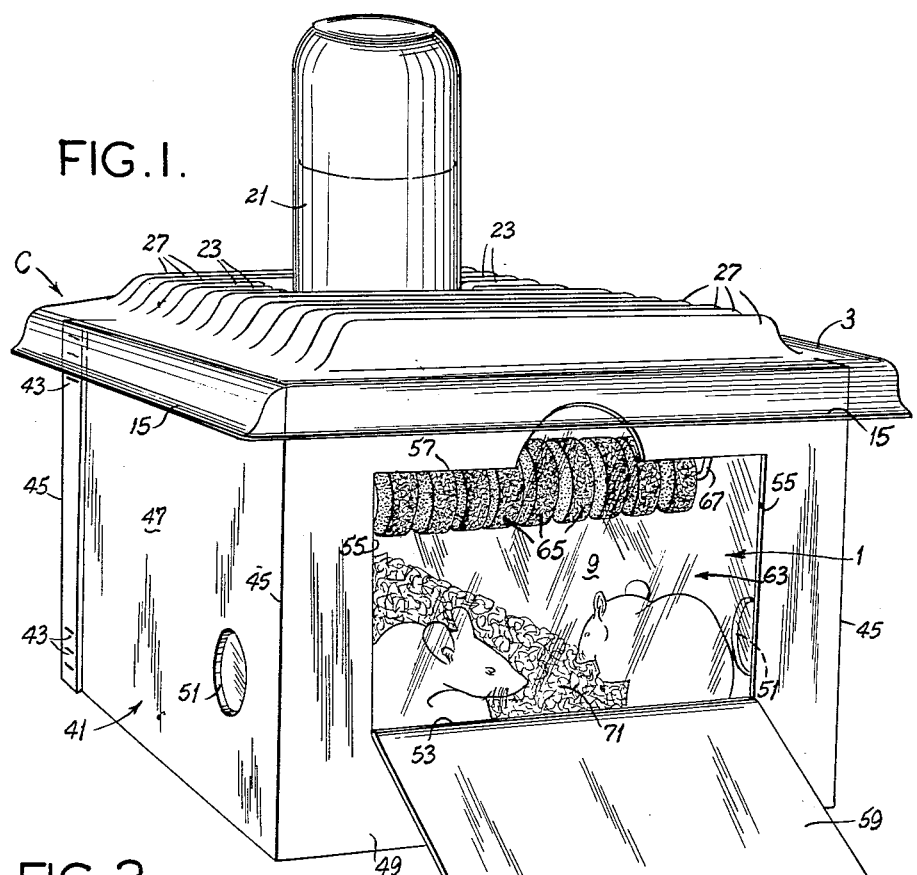
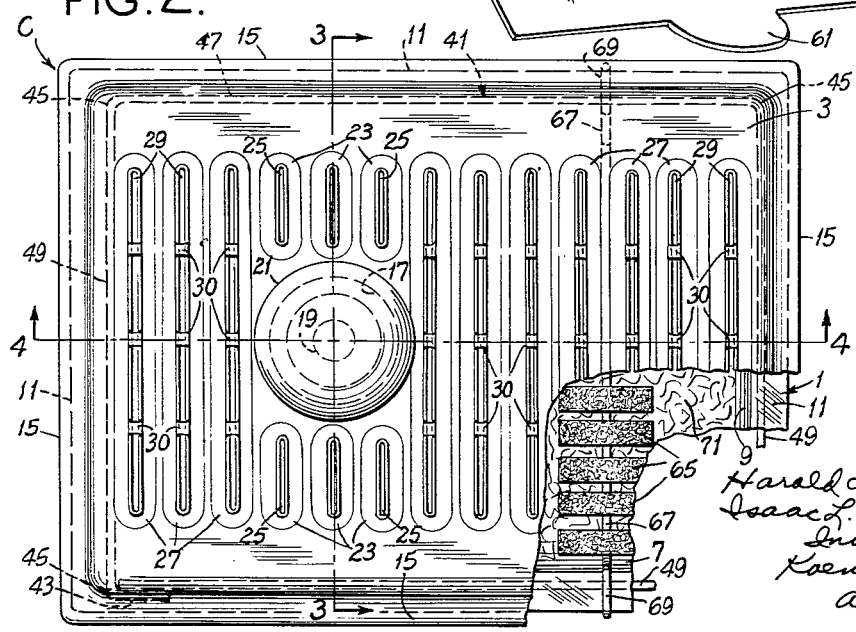

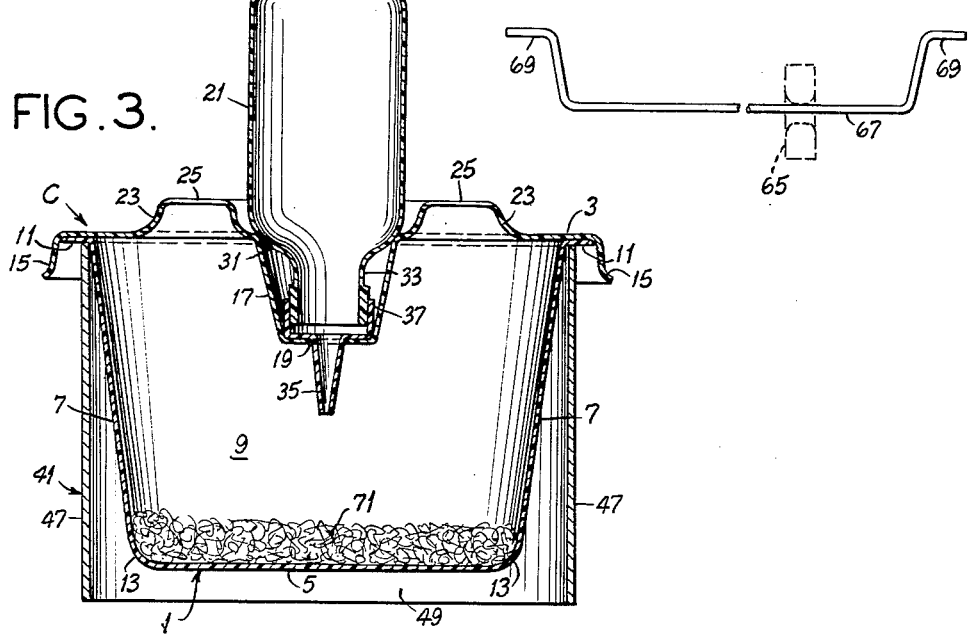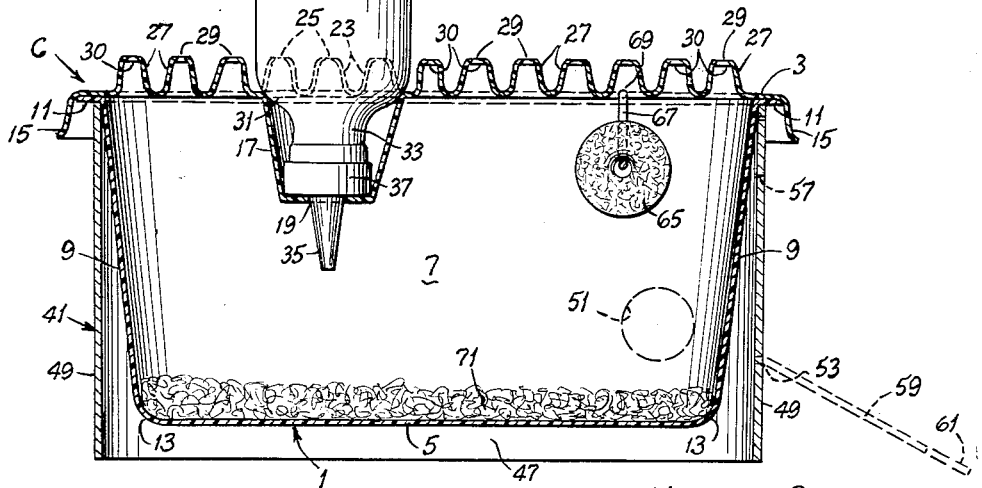

Feb. 25, 1964     I. L. SHECHMEISTER ETAL     3,122,127
ANIMAL HOUSING
Filed Aug. 18, 1960     5 Sheets-Sheet 3
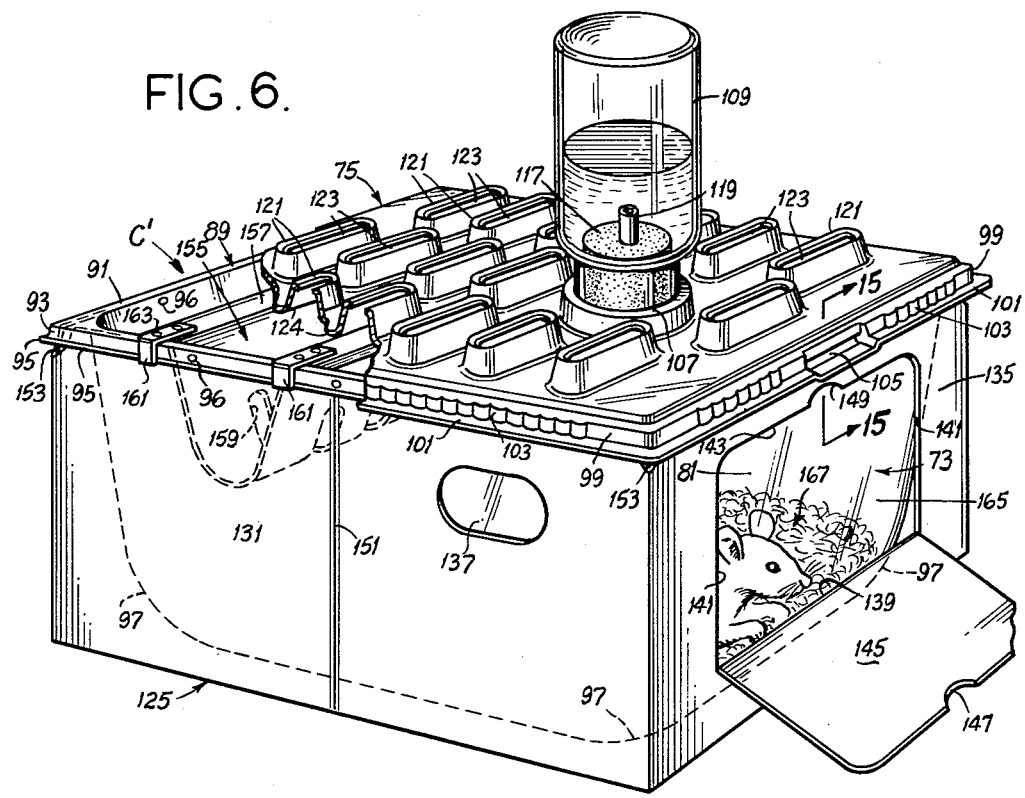

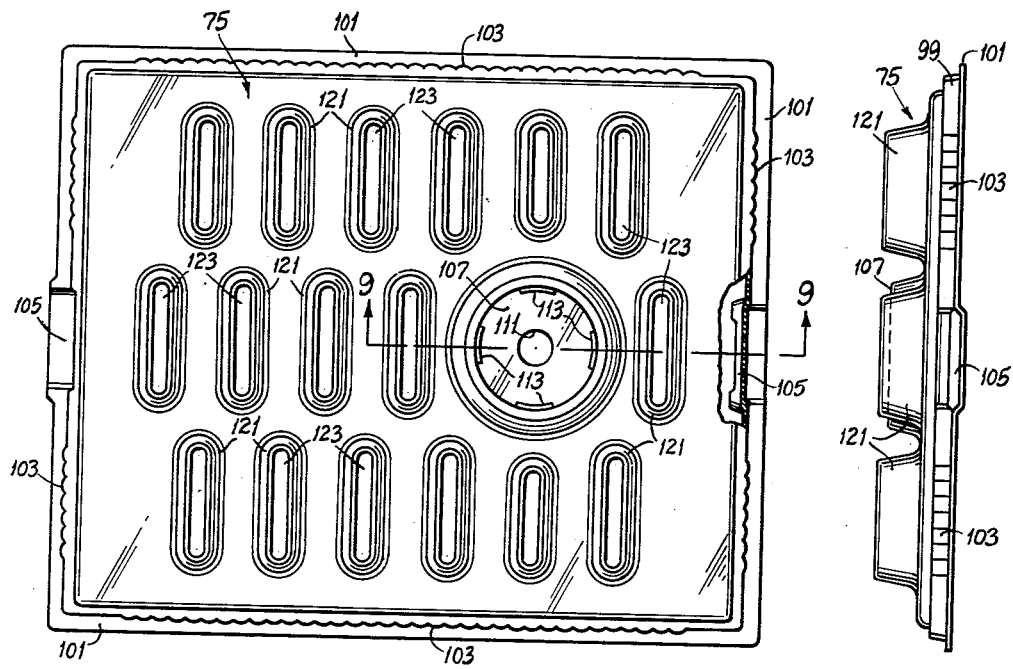
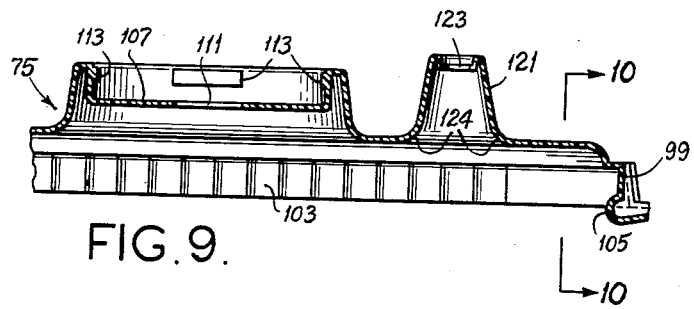
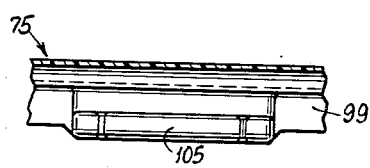
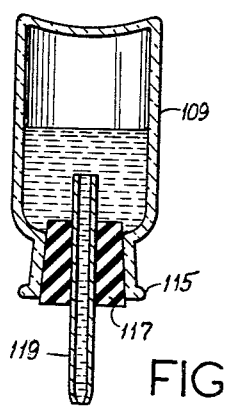

Feb. 25, 1964   I. L. SHECHMEISTER ETAL   3,122,127
ANIMAL HOUSING
Filed Aug. 18, 1960   5 Sheets-Sheet 5

Harold L. Cohen
Isaac L. Shechmeister,
Inventors.
Koenig and Pope,
Attorneys.

United States Patent Office 3,122,127
Patented Feb. 25, 1964

3,122,127
ANIMAL HOUSING
Isaac L. Shechmeister and Harold L. Cohen, Carbondale, Ill., assignors to Southern Illinois University Foundation, Carbondale, Ill., a corporation of Illinois
Filed Aug. 18, 1960, Ser. No. 64,507
17 Claims. (Cl. 119—18)

This invention relates to housing for small experimental animals, such as mice, and more particularly to disposable cages for such animals.

This application is a continuation-in-part of our copending application Serial No. 837,703, filed September 2, 1959, and now abandoned.

Heretofore, adequate housing for small experimental animals (mice in particular, or hamsters or the like) has been expensive, cumbersome and inefficient in yielding desired control. Organizations engaged in large-scale animal experimentation have been required to spend considerable sums for purchasing equipment such as metal cages and the necessary washing and sterilizing facilities. Organizations such as high schools, colleges and laboratories not routinely carrying out animal experiments heretofore have not been able to afford the desired use of animals in instruction and for research because of the expense of housing.

Accordingly, it is an object of this invention to provide an animal cage which may be disposed of after a single use, thereby eliminating washing and sterilizing costs, and which may be marketed at such a cost as substantially to reduce the expenditure of organizations engaged in large-scale animal experimentation for animal housing, and to make it economically possible for high schools, colleges and smaller laboratories to use animals in instruction and for research.

A further object of the invention is the provision of a disposable cage which affords comfort to the caged animal or animals, convenience for the investigator, economy for the caretaker and compliance with disease-control practices. As to animal comfort, it will be understood that adequate cage ventilation is important; the humidity in the cage should remain at about the same level as that of the room in which the cages are kept. As to investigator's convenience, it is important that transfer of animals from a dirty cage to a clean cage should be easily accomplished, with minimum possibility of confusion of laboratory records. As to economy and compliance with disease-control practices, it is important that dirty cages be quickly and easily disposable by incineration with a minimum of residue. The cage of the present invention fulfills these requirements.

Another object of the invention is the provision of a disposable cage which, while being inexpensively made of relatively inexpensive material, is substantially immune to chewing by encaged animals, thereby to prevent escape.

Still another object of the present invention is the provision of a disposable animal cage which may be stored and shipped in unassembled condition, and the parts of which when unassembled can be nested so as to occupy a minimum of space. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, FIG. 1 is a perspective of a housing of this invention as it appears when in use;

FIG. 2 is a plan view of FIG. 1 with parts broken away;

FIGS. 3 and 4 are vertical sections taken on lines 3—3 and 4—4, respectively, of FIG. 2;

FIG. 5 is a view illustrating one mode of providing food for encaged animals;

FIG. 6 is a perspective of another form of housing of this invention as it appears when in use, with parts broken away and shown in section;

FIG. 7 is a plan view of FIG. 6;

FIG. 8 is an end elevation of FIG. 7 of the lid member per se;

FIG. 9 is an enlarged vertical section taken on line 9—9 of FIG. 7;

FIG. 10 is an enlarged vertical section taken on line 10—10 of FIG. 9;

FIG. 16 is a plan view illustrating a form of feeder for use with the housing of FIG. 6;

FIG. 17 is a side elevation of FIG. 16;

FIG. 18 is an end elevation of the feeder of FIG. 16 with food supported therein; and FIG. 19 is a vertical section of a water bottle shown in FIG. 6.

Corresponding reference characters indicate corresponding parts throughout the several views of the drawings.

Figure 11:
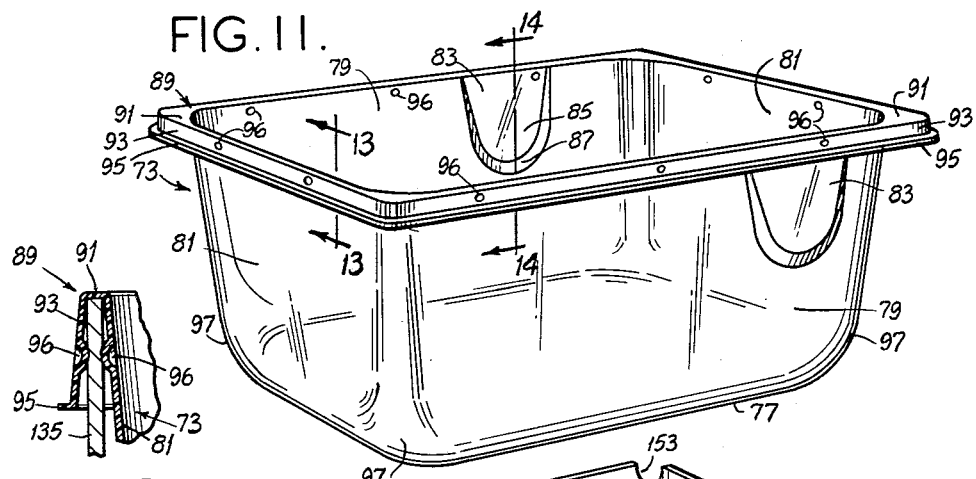
FIG. 11 is a perspective of the box of the housing of FIG. 6.

Referring to the drawings, a disposable cage C of this invention is shown to comprise a rectangular box 1 and a lid 3 for the box. Each of these is molded (injection-molded, for example) of a transparent and/or translucent synthetic plastic resin such as a vinyl resin. In general, any suitable plastic may be used that is capable of being quickly and easily disposed of by incineration with a minimum of residue. Thus, the box and lid may be molded of an acrylic resin, polyethylene, or cellulose acetate, instead of a vinyl resin.

The box 1 is a seamless box of rectangular shape in plan, having a bottom 5, side walls 7 and end walls 9, and being open at the top. The side walls 7 and end walls 9, rather than being vertical, are inclined outward from bottom to top. The box is molded with an outwardly projecting horizontal flange or rim 11 extending completely around the box at the top of the box. A typical box for occupancy by five mice, for example, may measure about nine by six inches at the bottom and about ten by seven inches at the inside of the top, being about five inches high. Rim 11 in such case may be about one-half inch wide. The thickness of the plastic as molded may be extremely thin ranging from about 0.0015 to about 0.03 inch. The side and end walls merge into the bottom at nicely rounded edge portions 13.

The lid 3 consists essentially of a flat rectangular molded plastic plate (which may be molded of the same kind of plastic as box 1) having a peripheral skirt 15. The lid is slightly larger in outline than the outline of the rim 11 of the box so that it may lie flat on the rim with skirt 15 surrounding the edge of rim 11 to prevent shifting of the lid on the box. The thickness of the plastic of the lid corresponds generally to that of the plastic of the box (i.e. 0.0015 to .03 inch). The lid 3 is molded with a cup-shaped depression 17 having a hole 19 in its bottom. This depression constitutes a socket for a water bottle 21 to be described. The depression or socket 17 is located on the longitudinal center line of the lid 3, but somewhat nearer one end of the lid than the other. On opposite sides of the bottle socket 17, the lid 3 is formed with a plurality of relatively short upwardly extending transverse corrugations 23 which are slotted lengthwise at the top as indicated at 25. Between the bottle socket 17 and the ends of the lid, there are relatively long upwardly extending transverse corrugations 27 which are slotted lengthwise at the top as indicated at 29. The slots at 25 and 29 constitute ventilation openings. The corrugations 23 and 27 are of tapered form in cross section. They are approximately one-half inch wide at the bottom, narrowing down to about one-eighth inch at the top (slots 25 and 29 being about one-eighth inch wide). The long corrugations 27 are shown as having four aligned slots 29, each somewhat shorter than one-fourth the length of the corrugations, with integral bridge portions 30 between the slots at the top of the corrugations to keep the corrugations from pinching closed.

The water bottle 21 is preferably a plastic bottle (such as a polyethylene bottle) having a rounded shoulder 31 and a neck 33, and provided with a tapered nipple 35 having a cap portion 37 fitted on the neck. The cap portion 37 engages the bottom of the socket 17 and the nipple 35 extends down into the box through the hole 19 in the bottom of the socket. The rounded shoulder 31 of the bottle is wedged into the top of the socket 17 (the socket being suitably dimensioned for this purpose). The large end of the tapered nipple 35 has a close fit in the hole 19 to prevent a mouse from chewing at the edge of the plastic around the hole. The fit of the water bottle 21 into the socket 17 is such that the bottle will not be dislodged or moved therefrom by accidental jarring of the lid 3.

The above-described cage 1 is of thin-walled construction (having walls 0.002 inch thick, for example), and with it is used a rectangular supporting frame 41 which may be made of paperboard such as relatively thin double-faced corrugated boxboard, for example. This frame consists, for example, of a strip of paperboard about five and one-half inches wide having its ends secured together as by stapling as indicated at 43 and having transverse scores as indicated at 45 constituting fold lines whereby the frame may be opened from a flat condition (for shipping and storing) to an erected condition wherein it is of rectangular form with vertical side walls 47 and end walls 49. The side walls 47 may be provided with finger holes such as indicated at 51 adjacent one end wall 49. This end wall has a horizontal score 53 adjacent its bottom, lines of severance 55 extending upward from the ends of the score 53 and a line of severance 57 extending between the upper ends of lines 55 defining a hinged flap 59 adapted to be separated from the end wall along the lines of severance 55 and 57 and swung downward and outward to an opened position such as shown in FIG. 1. The line of severance 57 may be formed to provide a central tab 61 at the edge of flap 59 opposite the score 53.

In use, the box 1 is placed in an erected frame 41 with the rim 11 of the box bearing on the upper edge of the frame. The flap 59 is opened before placing the box in the frame. This provides a window 63 in the frame 41 for viewing animals in the box 1. As shown in FIGS. 1, 2 and 5, a food supply for animals in the box is provided, comprising cylindrical food pellets 65 skewered on a wire 67 having end portions bent to provide hooks 69 for engaging the rim of the box, the wire with the food pellets thereon extending transversely across the box. The lid 3 is then placed on the box and the water bottle 21 entered in the socket. Suitable bedding 71, such as wood shavings or sugar beet pulp, is provided in the box.

FIGS. 6–19 show a modification of the housing of the invention in which the cage C' comprises a rectangular box 73 and a lid 75. The box 73 is a seamless box of rectangular shape in plan and has a bottom 77, side walls 79 and end walls 81, the top being open. The side walls 79 and end walls 81 are generally inclined outward from bottom to top. Each side wall 79 toward one end of the box 73 has an outwardly projecting portion 83 providing a recess 85 with a ledge 87 at the bottom of the recess (see FIGS. 11 and 14). The box is molded with a rim 89 having an outwardly projecting horizontal portion 91 and downwardly projecting portion 93 terminating in a slightly outstanding head 95. The rim 89 extends completely around the box 73 at the top thereof. Spaced at intervals along the inside surface of downwardly projecting portion 93 of rim 89 and along the outside surface of side walls 79 and end walls 81 near the top thereof are dimples 96. As shown, the side and end walls 79 and 81 merge into the bottom 77 at nicely rounded edge portions 97.

The lid 75 consists of a flat rectangular molded plastic plate having a downwardly extending flange 99 therearound and an outwardly extending lip 101. Flange 99 has a series of vertical corrugations 103 on each of the four sides of the lid and inwardly offset portions 105 at opposite ends thereof adapted to snap under edge portion 95 of rim 89 when the lid is applied to the box 73.

The lid 75 is molded with a circular socket 107 for a water bottle 109. Socket 107 is formed with a hole 111 in the bottom thereof and four inwardly extending projections 113 spaced at intervals around the wall thereof. The water bottle 109 may be a glass bottle having a rim 115 extending around the mouth thereof and having the mouth closed with a rubber stopper 117. A glass or metal tube 119 extends through an opening in the stopper 117. When applied to the socket 107, bottle 109 snaps into a locked position (as shown in FIG. 6) in which the rim 15 is disposed under projections 113 and tube 119 extends down into the box 73 through hole 111.

The lid 75 is formed with a plurality of relatively short upwardly extending transverse corrugations 121. As shown, there are three rows of corrugations 121, the corrugations of the center row being offset slightly in a longitudinal direction from the corrugations of the outer two rows. The corrugations are slotted lengthwise at the top as indicated at 123, the slots constituting ventilation openings. The corrugations 121 are of tapered form in cross section and the areas between the corrugations are smoothly rounded on the bottom thereof as indicated at 124 in FIG. 7 so as not to expose any surface for a mouse to chew.

Figures 12, 13:
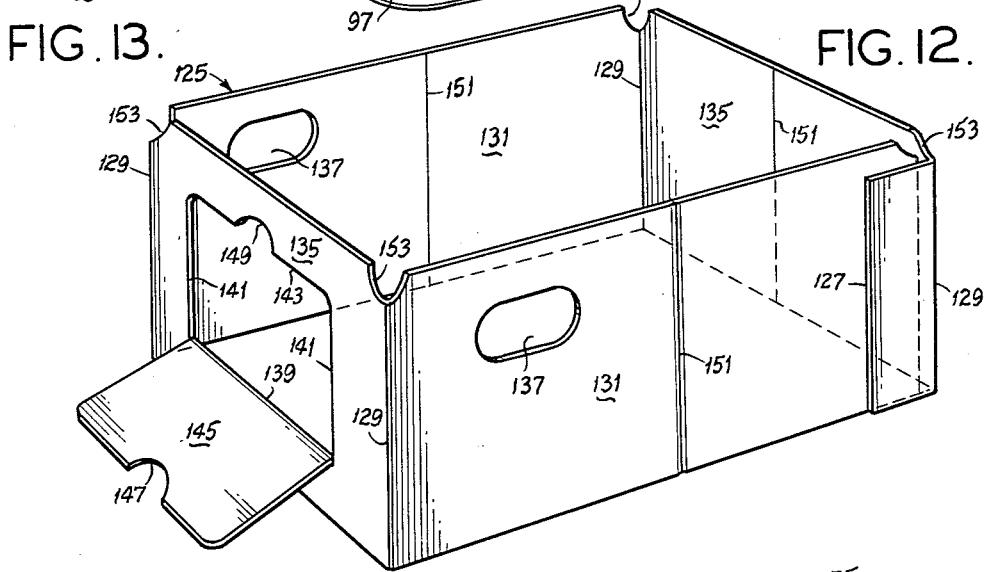
FIG. 12 is a perspective of the supporting frame of the housing of FIG. 6.
FIG. 13 is an enlarged vertical section taken on line 13—13 of FIG. 11.
Figure 14:
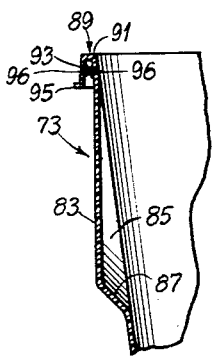
FIG. 14 is an enlarged vertical section taken on line 14—14 of FIG. 11.
Figure 15:
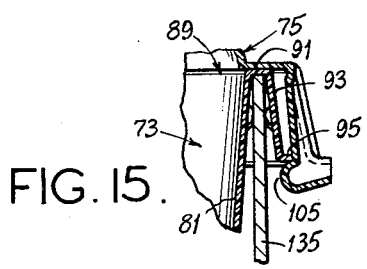
FIG. 15 is an enlarged vertical section taken on line 15—15 of FIG. 6.

A rectangular supporting frame 125 for supporting cage 73 consists, for example, of a strip of paperboard having its ends adhesively secured together as indicated at 127 and having transverse scores as indicated at 129 constituting fold lines whereby the frame may be opened from a flat condition to an erected condition wherein it is of rectangular form with vertical side walls 131 and end walls 135. The side walls 131 have holes 137 near the top thereof and adjacent one end wall 135. This end wall has a horizontal score 139 adjacent its bottom, lines of severance 141 extending upward from the ends of the score 139 and a line of severance 143 extending between the upper ends of lines 141 defining a hinged flap 145 adapted to be separated from the end wall along the lines of severance 141 and 143 and swung downward and outward to an opened position such as shown in FIGS. 6 and 12. Flap 145 has a semicircular cutout 147 at its upper edge related to a semicircular cutout 149 above the line of severance 143 in the end wall 135. When the flap is in a closed position, these cutouts constitute a finger opening for facilitating the grasping and lowering of the flap.

The side walls 131 and the rear end wall 135 have scores as indicated at 151 constituting fold lines whereby the sides and rear end wall of the frame may be manually adjusted in fitting box 73 into the frame. Each of the four upper corners of the frame 125 has a cutout portion 153 to facilitate fitting of the four corners of the box 73 thereon when the box is applied to the frame.

At 155 is indicated a feeder unit which may be utilized with the box 73 for providing food for encaged animals. As shown, feeder unit 155 is of trough shape in cross section and has outwardly extending horizontal flanges 157 at the upper edges thereof, the flanges being slightly bent downward at their outer edges. The unit has a series of transverse slots 159 spaced longitudinally thereof, each slot being of such width that food may extend down therethrough so that a mouse, for example, may chew food overlying the openings. At the ends of flanges 157 are tabs 161 secured to the flanges as indicated at 163. As shown, tabs 161 extend out beyond the ends of flanges 157.

In use, the box 73 is placed in an erected frame 125 with the rim 89 fitting over the upper edge of the frame, dimples 96 bearing against the inside and outside surfaces of side walls 131 and end walls 135 of the frame. In placing the box 73 in frame 125, the side walls and rear end wall 135 may be moved inwardly on fold lines 151 to facilitate proper fitting of the rim 89 over the upper edge of the frame. The flap 145 is opened before placing the box 73 in the frame. This provides a window 165 in the frame 125 for viewing animals in the box 73.

After the box 73 has been placed in the frame 125, the feeder unit 155 is fitted into recesses 85 of the box 73 so that the ends thereof bear against inclined portion 83 of the side walls 79 and the bottom bears on ledge 87 at each side. Tabs 161 are then bent down over rim 89 of the box 73 to lock the feeder unit in place (see FIG. 6). A food supply for the animals in the box is placed in the feeder unit so as to extend through or overlie slots 159.

The lid 75 is then applied to the box, inwardly offset portions 105 at each end of the box being snapped under edge 95 of the rim 89 to releasably lock lid 75 in position. A water bottle 109 is then entered into socket 107 as previously described. Suitable bedding 167 is provided in the box.

Tests on the above described housings indicate that encaged mice are most comfortably housed. The relative humidity and temperature in the cages C or C' closely follow the relative humidity and temperature of the room in which the cage is placed, and the encaged mice consume adequate amounts of food and water. The flap 59 or 145 may be utilized as a record card for laboratory data, permitting the possibility of color coding of experiments, the age or sex of mice, breeding or any of a variety of visual laboratory procedure control. When a cage C or C' has become dirty, it may be easily lifted out of its supporting frame 41 or 125, the lid 3 or 75 taken off, and the mice transferred to a clean cage, after which the dirty cage may be readily disposed of by incineration in accordance with disease-control practice. The clean cage with the mice therein is then replaced in the supporting frame, which still has the flap 59 or 145 attached thereto with data thereon relating to the mice. This eliminates the need for transfer of the data from one cage to another, thus avoiding the possibility of error in transfer of data. All the required information is kept on the card constituted by the flap 59 or 145, which is part of the frame structure 41 or 125, respectively, supporting the changeable plastic cage C or C', respectively. This flap or card 59 or 145 is easily detached by tearing it off on line 53 or 139 at termination of an experiment and filed away.

It will be observed that the box 1 or 73 has a smooth interior devoid of edges to preclude chewing by an animal housed therein. Also, the width of the corrugations 23 and 27 or 121 is such as to preclude an animal housed in the cage from chewing the edges of the lid material at the slots 25 and 29 or 123. In this respect, it has been found that the presence of edges on which mice can obtain a tooth grip is most undesirable, making it relatively easy for the mice to chew a hole in the enclosure and escape. It is contemplated that a food-supporting wire may have end portions received in holes in the side walls of the box, and in such case the wire diameter would closely approximate the hole diameter to keep mice from chewing at the edges of the material around the holes.

The use of the supporting frame 41 or 125 is particularly desirable in the case of thin-walled disposable cages C or C' such as above described and to provide the convenience of the flap 59 or 145 serving as a record card. However, in some instances, it may be desired to dispense with the use of a frame, in which case the cage would be made of a thicker-walled construction. In this event, the cage may be used as a permanent or semipermanent cage if so desired.

It will be understood that the cages of the invention may be made in various sizes for single or multiple occupancy.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. A disposable cage for housing laboratory animals such as mice and the like comprising an open-top box and a removable lid for the box, said box and lid being made of plastic material adapted to be disposed of by incineration, said lid having depending peripheral portions fitting around the top of the box, said lid having a plurality of upwardly extending corrugations, said corrugations having openings providing for ventilation, the width of said corrugations being such as to preclude an animal from chewing the edges of the lid material at the openings.

2. A disposable cage as set forth in claim 1 wherein said lid has means for supporting a water bottle for supplying water to an animal housed in the cage.

3. A disposable cage for housing laboratory animals such as mice and the like comprising an open-top box and a removable lid for the box, said box and lid being made of transparent plastic material adapted to be disposed of by incineration, said box having an outwardly projecting rim at the top thereof, said lid having a peripheral skirt fitting around the edge of the rim, said box having a smooth interior substantially devoid of edges to preclude chewing by an animal housed therein, said lid having a plurality of upwardly extending corrugations, said corrugations having openings providing for ventilation, the width of said corrugations being such as to preclude an animal from chewing the edges of the lid material at the slots.

4. A disposable cage as set forth in claim 3 wherein said lid has means for supporting a water bottle having a nipple with the nipple extending down into the box through an opening in the lid.

5. A disposable cage for housing laboratory animals such as mice and the like comprising an open-top box and a removable lid for the box, said box and lid being made of plastic material adapted to be disposed of by incineration, said box having a rim extending around the top thereof, said rim having an outwardly projecting horizontal portion, a downwardly projecting portion and an outwardly extending bead, said lid having a downwardly extending flange fitting around the edge of the rim and inwardly offset portions adapted to snap under the edge of the rim, said box having a smooth interior substantially devoid of edges to preclude chewing by an animal housed therein, said lid having a plurality of upwardly extending corrugations, said corrugations having openings providing for ventilation, the width of said corrugations being such as to preclude an animal from chewing the edges of the lid material at the slots.

6. A disposable cage as set forth in claim 5 wherein the lid is formed with a socket for reception of a water bottle having a nipple, said socket having a hole in the bottom through which the nipple extends down into the box.

7. A housing for laboratory animals such as mice and the like comprising a paperboard frame open at top and bottom, a disposable cage received in said frame comprising an open-top box and a removable lid for the box, said box and lid being made of transparent plastic material adapted to be disposed of by incineration, said box having an outwardly projecting rim at the top thereof bearing on the top edge of the frame, said lid having depending peripheral portions fitting around the edge of the rim, said lid having a plurality of upwardly extending corrugations, said corrugations having openings providing for ventilation, the width of said corrugations being such as to preclude an animal from chewing the edges of the lid material at the openings, said frame having a window therein.

8. A housing as set forth in claim 7 wherein said lid has means for supporting a water bottle for supplying water to an animal housed in the cage.

9. A housing for laboratory animals such as mice and the like comprising a paperboard frame open at top and bottom, a disposable cage received in said frame comprising an open-top box and a removable lid for the box, said box and lid being made of transparent plastic material adapted to be disposed of by incineration, said box having an outwardly projecting rim at the top thereof bearing on the top edge of the frame, said lid having a peripheral skirt fitting around the edges of the rim, said box having a smooth interior substantially devoid of edges to preclude chewing by an animal housed therein, said lid having a plurality of upwardly extending corrugations, said corrugations having openings at the top extending lengthwise thereof providing for ventilation, the width of said corrugations being such as to preclude an animal from chewing the edges of the lid material at the openings, said frame having a hinged flap providing a window.

10. A housing as set forth in claim 9 wherein said lid is formed with means for supporting a water bottle having a nipple with the nipple extending down into the box through an opening in the lid.

11. A housing for laboratory animals such as mice and the like comprising a paperboard frame open at top and bottom, a disposable cage received in said frame comprising an open-top box and a removable lid for the box, said box and lid being made of plastic material adapted to be disposed of by incineration, said box having a rim extending around the top thereof, said rim having an outwardly projecting horizontal portion, a downwardly projecting portion and an outwardly extending bead, said lid having a downwardly extending flange fitting around the edge of the rim and inwardly offset portions adapted to snap under the edge of the rim, said box having a smooth interior substantially devoid of edges to preclude chewing by an animal housed therein, said lid having a plurality of upwardly extending corrugations, said corrugations having openings providing for ventilation, the width of said corrugations being such as to preclude an animal from chewing the edges of the lid material at the openings, said frame having a hinged flap providing a window.

12. A housing for laboratory animals such as mice and the like comprising a rectangular paperboard frame open at top and bottom having side and end walls joined at vertical hinge lines, a disposable cage received in said frame comprising a rectangular open-top box and a removable rectangular lid for the box, said box and lid being made of transparent plastic material adapted to be disposed of by incineration, said box having outwardly inclined side and end walls and an outwardly projecting rim at the top thereof bearing on the top edge of the frame, said lid having a peripheral skirt fitting around the edge of the rib, said box having a smooth interior substantially devoid of edges to preclude chewing by an animal housed therein, said lid having a plurality of upwardly extending transverse corrugations, said corrugations having slots at the top extending lengthwise thereof providing for ventilation, the width of said corrugations being such as to preclude an animal from chewing the edges of the lid material at the slots, one end wall of the frame having a hinged flap adapted to be opened outward and downward away from the frame to provide a window and to serve as a record card for laboratory data.

13. A housing as set forth in claim 12 wherein the lid is formed with a socket for reception of a water bottle having a nipple, said socket having a hole in the bottom through which the nipple extends down into the box 14. A housing for laboratory animals such as mice and the like comprising a rectangular paperboard frame open at top and bottom and having side and end walls joined at vertical hinge lines, a disposable cage received in said frame comprising a rectangular open-top box and a removable rectangular lid for the box, said box and lid being made of transparent plastic material adapted to be disposed of by incineration, said box having outwardly inclined side and end walls and an outwardly projecting rim at the top thereof fitting over the top edge of the frame, said rim having an outwardly projecting horizontal portion, a downwardly projecting portion and an outwardly extending bead, said lid having a downwardly extending flange fitting around the edge of the rim and inwardly offset portions adapted to snap under the edge of the rim, said box having a smooth interior substantially devoid of edges to preclude chewing by an animal housed therein, said lid having a plurality of upwardly extending transverse corrugations, said corrugations having slots at the top extending lengthwise thereof providing for ventilation, the width of said corrugations being such as to preclude an animal from chewing the edges of the lid material at the slots, one end wall of the frame having a hinged flap adapted to be opened outward and downward away from the frame to provide a window and to serve as a record card for laboratory data.

15. A non-self-supporting cage for laboratory animals such as mice and the like comprising an open-top box and a removable lid for the box, said box being made of plastic material adapted to be disposed of by incineration, said lid having depending peripheral portions fitting around the top of the the box, said box having relatively thin end and side walls generally inclined outward from bottom to top and a rim extending around the top thereof, said walls having a thickness between 0.0015 and 0.03 in., said rim having an outwardly projecting horizontal portion extending outwardly from the upper edge of said walls and a downwardly projecting portion extending downwardly from the outer edge of said horizontal portion and thereby providing a downwardly opening channel for the reception of the upper edge of a frame for supporting the cage.

16. A housing for laboratory animals such as mice and the like comprising a paperboard frame open at top and bottom, a non-self-supporting cage received in said frame comprising an open-top box and a removable lid for the box, said box being made of transparent plastic material adapted to be disposed of by incineration, said box having relatively thin end and side walls generally inclined outward from bottom to top and a rim extending around the top thereof, said walls having a thickness between 0.0015 and 0.03 in., said lid having a peripheral skirt fitting around the edges of the rim, said rim having an outwardly projecting horizontal portion extending outwardly from the upper edge of said walls and a downwardly projecting portion extending downwardly from the outer edge of said horizontal portion and thereby providing a downwardly opening channel for the reception of the upper edge of said frame, said frame having a window therein.

17. A non-self-supporting cage for laboratory animals such as mice and the like comprising an open-top box and a removable lid for the box, said box being made of plastic material adapted to be disposed of by incineration, said lid having depending peripheral portions fitting around the top of the box, said box having relatively thin end and side walls generally inclined outward from bottom to top and a rim extending around the top thereof, said walls having a thickness between 0.0015 and 0.03 in., said rim having an outwardly projecting horizontal portion extending outwardly from the upper edge of said walls and a downwardly projecting portion extending downwardly from the outer edge of said horizontal portion and thereby providing a downwardly opening channel for the reception of the upper edge of a frame for supporting the cage, two of said walls having outwardly offset portions adjacent the top thereof providing recesses for receiving the ends of a food hopper, said recesses having shoulders at the bottom thereof on which the ends of said food hopper bear and being adapted for insertion of said food hopper from the top of said box.

References Cited in the file of this patent

UNITED STATES PATENTS

| | | |
|---|---|---|
| 173,722 | Hayes | Feb. 22, 1876 |
| 260,470 | Fisher | July 4, 1882 |
| 1,970,970 | Nolan | Aug. 21, 1934 |
| 2,254,939 | Elias | Sept. 2, 1941 |
| 2,386,306 | Gardiner | Oct. 9, 1945 |
| 2,467,525 | Fricke | Apr. 19, 1949 |
| 2,470,223 | Powels | May 17, 1949 |
| 2,988,044 | Aldelberg et al. | June 13, 1961 |

FOREIGN PATENTS

| | | |
|---|---|---|
| 530,178 | Great Britain | Dec. 6, 1940 |
| 471,667 | Italy | Mar. 20, 1952 |